United States Patent [19]

Highfill

[11] Patent Number: 4,962,728

[45] Date of Patent: Oct. 16, 1990

[54] USE OF POTASSIUM KURROL'S SALT TO PRESERVE LIVE FISH

[75] Inventor: Louis A. Highfill, Union, Mo.

[73] Assignee: Monsanto Company, St. Louis, Mo.

[21] Appl. No.: 329,175

[22] Filed: Mar. 27, 1989

[51] Int. Cl.$^5$ ............................................. A01K 61/00
[52] U.S. Cl. ........................................................ 119/3
[58] Field of Search ..................... 119/3; 423/305, 312

[56] References Cited

U.S. PATENT DOCUMENTS

| | | | |
|---|---|---|---|
| 3,110,285 | 11/1963 | Greenough | 119/3 |
| 3,306,256 | 2/1967 | Lewis | 119/3 |
| 3,522,793 | 8/1970 | Proewig | 119/3 |
| 3,683,855 | 8/1972 | Levitov | 119/3 X |
| 4,188,372 | 2/1980 | Gaffer | 424/52 X |
| 4,202,291 | 5/1980 | Kominami et al. | 119/3 |
| 4,350,680 | 9/1982 | Harvey et al. | 424/52 |

FOREIGN PATENT DOCUMENTS

| | | | |
|---|---|---|---|
| 3245628 | 10/1988 | Japan | 119/3 |
| 1242079 | 7/1986 | U.S.S.R. | 119/3 |

*Primary Examiner*—Robert P. Swiatek
*Assistant Examiner*—Todd E. Manahan
*Attorney, Agent, or Firm*—L. L. Limpus

[57] ABSTRACT

A process for maintaining live fish is disclosed wherein the live fish are confined within a dilute solution containing an alkali metal Kurrol's salt which is preferably potassium Kurrol's salt.

19 Claims, No Drawings

USE OF POTASSIUM KURROL'S SALT TO PRESERVE LIVE FISH

This invention relates to a process for maintaining live fish wherein the live fish are confined within a dilute solution containing an alkali metal Kurrol's salt.

More particularly, this invention relates to the use of potassium Kurrol's salt as an aid to extend the life of live fish confined in a container or an aquarium. A solution containing potassium Kurrol's salt will increase the survival time of minnows kept in bait buckets and will keep larger fish alive longer in a live well.

BACKGROUND OF THE INVENTION

Description of Prior Art

Fishermen have for centuries caught fish using spears, artificial lures, worms, grasshoppers, and small live fish such as minnows. When live fish such as minnows have been used for bait, a principal problem has been keeping the bait alive. Efforts have focused on keeping the container holding the live bait cool and changing the water within the container often to maintain its freshness and oxygen content. While such efforts have been somewhat successful, the use of live bait has generally been restricted to fishing parties of relatively short duration and the purchase of many extra minnows has been required. Similar problems occur when it is desired to keep larger fish alive in a live well. It has generally been possible to keep these larger fish alive for only a short time period.

Summary of the Invention

This invention provides an improved process for extending the survival time of live fish which are confined in a container wherein an alkali metal Kurrol's salt is dissolved in the water containing the live fish. When the alkali metal Kurrol's salt is the preferred potassium Kurrol's salt, the amount of potassium Kurrol's salt dissolved in the water can be any life extending amount and it preferably is an amount sufficient to create a solution containing from about 50 parts per million (ppm) to about 1,000 ppm by weight potassium Kurrol's salt, preferably from about 100 ppm to about 800 ppm by weight potassium Kurrols's salt, and more preferably from about 100 ppm to about 200 ppm by weight potassium Kurrols's salt which will extend the survival time of live fish when compared to the survival time of live fish confined in similar amounts of water without the alkali metal Kurrol's salt.

While potassium Kurrol's salt is preferred, other alkali metal Kurrol's salts may be utilized and their concentration in the solution will be about the same as the concentrations set forth above for potassium Kurrol's salt. Dissolving the preferred amounts of alkali metal Kurrol's salt in the water in the container confining the live fish will reduce the death rate of the fish for a particular confinement time; thus, the number of fish that die within a given period of time may be reduced as much as from 10 to 15 percent.

DESCRIPTION OF THE PREFERRED EMBODIMENTS

Potassium Kurrol's salt, or another alkali metal Kurrol's salt, is dissolved in the water which will be used to contain live fish to extend the survival time of the live fish during their confinement. Other Kurrol's salts made from the alkali metal salts, that is, sodium, lithium, rubidium, and cesium, may also be used; however, potassium Kurrol's salt is preferred as sodium Kurrol's salt is much more difficult to produce and the others are more expensive to produce.

Potassium Kurrol's salt is not readily soluble in water. However, the addition of diverse ions, for example, sodium ions, to the water with the potassium Kurrol's salt will make the potassium Kurrol's salt go into solution very rapidly. The liquid should be stirred gently during the addition of the potassium Kurrol's salt to reduce the time required for the salt to go into solution.

In the process of this invention, the water typically contains potassium Kurrol's salt in a range of from about 50 ppm to about 1000 ppm by weight, and preferably from about 100 ppm to about 800 ppm by weight, and more preferably from about 100 ppm to about 200 ppm by weight potassium Kurrol's salt. It may be possible to use a solution greater than about 1000 ppm by weight potassium Kurrol's salt but the solution may be too viscous and it is more difficult to get the potassium Kurrol's salt into solution at that higher concentration. A solution containing less than about 50 ppm by weight of potassium Kurrol's salt may fail to provide the benefits expected from this invention.

Numerous materials, including lithium, ammonium, sodium, cesium and rubidium, among others, may be used to provide the diverse ions required in the solution to make the potassium Kurrol's salt readily soluble. Sodium ions are preferred because sodium is relatively inexpensive and it is nontoxic, whereas the other alkali metals may have some toxicity.

In the following example, the diverse ions were provided as sodium ions from sodium tripolyphosphate (STP). While STP was added to the solution at approximately one-half the amount by weight of the addition of the potassium Kurrol's salt the amount of STP or other source of diverse ions added to the solution may be varied greatly without affecting this invention. It is only necessary to add diverse ions in an amount sufficient to render the potassium Kurrol's salt more readily soluble. The speed at which the potassium Kurrol's salt dissolves is directly dependent upon the concentration of diverse ions in the solution. Even very small amounts of diverse ions will cause the potassium Kurrols' salt to enter the solution more readily than in their absence. The addition of greater amounts of STP or other diverse ions will increase the speed at which the potassium Kurrol's salt enters solution; but, the expense of adding additional amounts of STP or other materials must be balanced against the time required for the potassium Kurrol's salt to enter the solution.

The solution of potassium Kurrol's salt may be prepared using either a basic or acidic solution; but the basic solution is preferred as it is the more stable system. Sodium ions are the preferred diverse ions and STP is a preferred souce of sodium ions because it is a readily available, inexpensive source of sodium ions that is basic and dissolves easily in water. Other examples of sources of sodium ions include sodium hydroxide, sodium sulfate, sodium carbonate, sodium hexametaphosphate, disodium pyrophosphate, tetrasodium pyrophosphate, sodium chloride, sodium borate, sodium bicarbonate, sodium formate, sodium acetate, sodium propionate, sodium citrate, sodium tartrate, sodium oxide, sodium peroxide, sodium perborate, sodium nitrate, sodium lactate, trisodium phosphate, and disodium phosphate.

The ratio of potassium to phosphorus is important. It is preferred that the potassium Kurrol's salt added to the process water have a $K_2O$ to $P_2O_5$ mole ratio within a range of from about 0.80 to about 1.05. It is more preferred that the $K_2O/P_2O_5$ mole ratio be within a range of from about 0.80 to about 0.98. It is even more preferred that the mole ratio of $K_2O/P_2O_5$ be about 0.98. During the manufacture of the potassium Kurrol's salt, the $K_2O/P_2O_5$ mole ratio may be varied by changing the ratio of the potassium and the phosphorus compounds. For example, the ratio of potassium carbonate to phosphoric acid may be varied to change the $K_2O/P_2O_5$ mole ratio to any desired ratio within the range of from about 0.80 to about 1.05. The mole ratio may be changed, for example, by the addition of excess phosphoric acid during the manufacture of the potassium Kurrol's salt to reduce the $K_2O/P_2O_5$ mole ratio from 1.0 to 0.98 or less, and preferably to reduce the $K_2O/P_2O_5$ mole ratio to within the preferred range of from about 0.80 to about 0.98.

The invention will be better understood by the following example which illustrates, but does not limit, the process and effectiveness of this invention, the use of an alkali metal Kurrol's salt such as potassium Kurrol's salt as an aid to extend the life of live fish which are confined in a container.

To demonstrate the effectiveness of this invention, 2.0 grams of potassium Kurrol's salt having a $K_2O/P_2O_5$ mole ratio of about 0.98 and 1.1 grams of sodium tripolyphosphate (STP) were added to 100 ml of distilled water. The solution was stirred overnight with a nitrogen purge so that all of the potassium Kurrol's salt would enter into solution. Then 75 grams of the solution containing the potassium Kurrol's salt were added to a container which contained 1.9 liters of water creating a solution containing about 760 ppm by weight potassium Kurrol's salt. As a control, 1.9 liters of water were placed in a similar container. Fifty live minnows were placed in each container and the containers were set aside for observation. During the observation period, the air and water temperatures were measured and the dead minnows were removed from the container. The time periods, the air and water temperatures, and the number of live minnows remaining in the container at the end of each period are shown in the table below. In the table the designation $K(PO_3)_n$ represents the potassium Kurrol's salt solution.

| Time (Hours) | Air Temperature | Water Temperature | Live Fish $K(PO_3)_n$ | Live Fish Control |
| --- | --- | --- | --- | --- |
| 0 | 25° C. | 20° C. | 50 | 50 |
| 2 | 30° C. | 22° C. | 45 | 45 |
| 3 | 31° C. | 23° C. | 39 | 36 |
| 4.5 | 32° C. | 24° C. | 33 | 27 |
| 6 | 33° C. |  | 25 | 22 |

The example illustrates the principal benefit received from the use of potassium Kurrol's salt, or other alkali metal Kurrol's salts, dissolved in the water used to confine live fish. The use of the Kurrol's salt reduced the death rate of the confined live fish.

The foregoing description of this invention is not intended to limit the invention. As will be apparent to those skilled in the art, many variations on and modifications to the embodiment described above may be made without departure from the spirit and scope of this invention.

I claim:

1. A process for maintaining live fish in water wherein an alkali metal Kurrol's salt and a source of diverse ions in an amount sufficient to render said Kurrol's salt soluble are dissolved in said water.

2. The process of claim 1 wherein said alkali metal Kurrol's salt is potassium Kurrol's salt.

3. The process of claim 2 wherein said potassium Kurrol's salt is dissolved in said water in an amount sufficient to create a solution containing from about 50 ppm to about 1,000 ppm potassium Kurrol's salt.

4. The process of claim 3 wherein said potassium Kurrol's salt has a $K_2O/P_2O_5$ mole ratio between about 0.80 and about 1.05.

5. The process of claim 3 wherein said potassium Kurrol's salt is dissolved in said water in an amount sufficient to create a solution containing from about 100 ppm to about 800 ppm potassium Kurrol's salt.

6. The process of claim 5 wherein said potassium Kurrol's salt has a $K_2O/P_2O_5$ mole ratio of between about 0.80 and 0.98.

7. The process of claim 5 wherein said potassium Kurrol's salt is dissolved in said water in an amount sufficient to create a solution containing from about 100 ppm to about 200 ppm potassium Kurrol's salt.

8. The process of claim 7 wherein said potassium Kurrol's salt has a $K_2O/P_2O_5$ mole ratio of about 0.98.

9. In a process for maintaining live fish in water, the improvement comprising adding potassium Kurrol's salt in an amount sufficient to create a solution containing from about 50 ppm to about 1000 ppm potassium Kurrol's salt, and a source of diverse ions in an amount sufficient to make said potassium Kurrol's salt soluble, to said water, said potassium Kurrol's salt having a $K_2O/P_2O_5$ mole ratio between about 0.80 and about 1.05.

10. The process of claim 9 wherein said potassium Kurrol's salt is added to said water in an amount sufficient to create a solution containing from about 100 ppm to about 800 ppm potassium Kurrol's salt.

11. The process of claim 10 wherein said potassium Kurrol's salt is added to said water in an amount sufficient to create a solution containing from about 100 ppm to about 200 ppm potassium Kurrol's salt.

12. The process of claim 11 wherein said potassium Kurrol's salt has a $K_2O/P_2O_5$ mole ratio of about 0.98.

13. The process of claim 10 wherein said potassium Kurrol's salt has a $K_2O/P_2O_5$ mole ratio between about 0.80 and about 0.98.

14. The process of claim 9 wherein said source of diverse ions is selected from the group consisting of lithium, sodium, ammonium, cesium, and rubidium.

15. The process of claim 14 wherein said source of diverse ions is sodium.

16. In a process for maintaining live fish in water, the improvement comprising adding potassium Kurrol's salt in an amount sufficient to create a solution containing from about 100 ppm to about 800 ppm potassium Kurrol's salt, and a source of diverse ions selected from the group consisting of lithium, sodium, ammonium, cesium, and rubidium in an amount sufficient to make said potassium Kurrol's salt soluble, to said water, said potassium Kurrol's salt having a $K_2O/P_2O_5$ mole ratio between about 0.80 and about 0.98.

17. The process of claim 16 wherein said source of diverse ions is sodium.

18. The process of claim 17 wherein said potassium Kurrol's salt has a $K_2O/P_2O_5$ mole ratio of about 0.98.

19. An aqueous solution for maintaining live fish confined in a container wherein the life expectancy of said live fish is increased which comprises water, an amount of alkali metal Kurrol's salt sufficient to extend the life of said fish, and a source of diverse ions in an amount sufficient to render said Kurrol's salt more readily soluble in said water.

* * * * *